Aug. 2, 1949.  H. B. FUGE  2,478,155
POLYPHASE MOTOR BRAKING SYSTEM
Filed July 13, 1945  2 Sheets-Sheet 1

Inventor
Harry B. Fuge
By William P. Stewart
Attorney

Aug. 2, 1949.     H. B. FUGE     2,478,155
POLYPHASE MOTOR BRAKING SYSTEM
Filed July 13, 1945     2 Sheets-Sheet 2

Inventor
Harry B. Fuge
By William P. Stewart
Attorney

Patented Aug. 2, 1949

2,478,155

UNITED STATES PATENT OFFICE 2,478,155

POLYPHASE MOTOR BRAKING SYSTEM

Harry B. Fuge, Somerville, N. J., assignor to The Singer Manufacturing Company, Elizabeth, N. J., a corporation of New Jersey Application July 13, 1945, Serial No. 604,960

4 Claims. (Cl. 318—211)

This invention relates to the improved electrical braking of polyphase motors of the induction type and more especially to a novel system of braking in which the braking torque is supplied by plugging the motor.

The term electrical braking is used herein to distinguish from mechanical braking and refers to systems which depend upon changes in the electrical connections of the motor and the associated circuits and includes dynamic braking and plugging.

It is generally known in the art to electrically brake polyphase motors by plugging. This has heretofore been accomplished by reversing the phase rotation of the voltages applied to the motor terminals while the motor is rotating in a forward direction. This results in the application of a reverse motor torque which opposes the forward torque supplied by the stored kinetic energy of rotation and the motor is quickly brought to standstill, at which point it is disconnected from the line to prevent reversal.

While it is recognized that polyphase plugging braking is the fastest electrical braking now obtainable it does have some disadvantages. Among these disadvantages may be cited the following: (1) It requires the reversal of one phase which means extra interlock protection is necessary, and failure of such protection will result in a direct line-to-line short circuit; and (2) it may produce such large decelerating torques that special voltage-dropping equipment is necessary to protect the driven devices from damage by twisting off shafts or shearing off gear teeth.

It is an object of this invention to provide a system for electrically braking a polyphase motor employing a circuit which shall give inherent protection against line-to-line short circuits.

It is a further object of this invention to provide an electrical braking system for polyphase motors which shall be inherently less severe on the driven equipment than is the case with conventional polyphase plugging and which shall not require the extra devices demanded by said latter system for tempering said severity.

This has been accomplished, according to the present invention, by providing a circuit by means of which a polyphase induction motor may be reconnected as a capacitor split-phase motor of reversed phase rotation to which is applied a source of single-phase electrical energy.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
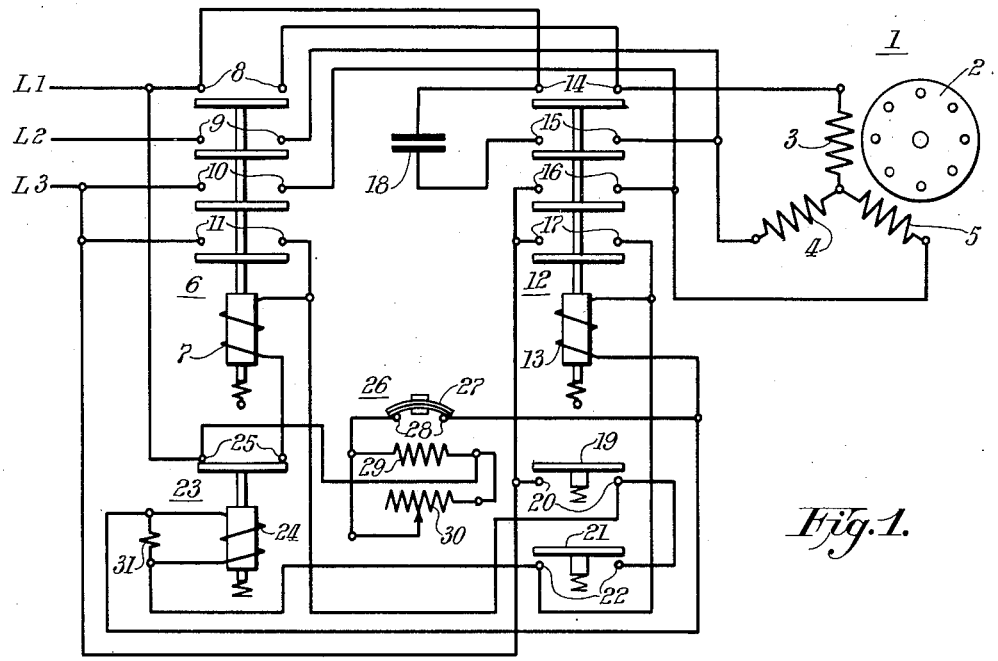
Fig. 1 is a diagrammatic illustration of a circuit for electrically braking a polyphase induction motor and embodying the invention.

Referring now to Fig. 1, the invention is shown as applied to a polyphase motor 1 having a rotor 2 and a stator provided with windings 3, 4 and 5. A normally-open starting contactor 6, having operating coil 7, and contacts 8, 9, 10 and 11 is employed to connect the motor windings 3, 4 and 5 with the supply lines L1, L2 and L3 of a three-phase source of alternating current to establish the normal polyphase running condition for the motor 1. A normally-open stopping contactor 12, having operating coil 13 and contacts 14, 15, 16 and 17, is employed to reconnect the motor windings 3, 4 and 5 with one phase, L1—L3, of the source and with a braking capacitor 18. These contactors are identical units and may be any of the conventional three-phase contactors having a set of auxiliary contacts. A starting push-button 19, with contacts 20, and a stopping push-button 21, with contacts 22, are used, as will be presently described, to actuate the contactors 6 and 12 respectively. A normally-closed interlock relay 23 having an operating coil 24 and contacts 25 is employed to insure that the starting contactor is substantially open when the stopping contactor is closed. It is especially to be noted at this point that this interlock provision is not critical in this circuit because no damage can occur even if both contactors are momentarily closed at the same time. A slight and harmless delay in the beginning of the braking period is the only result.

As with all plugging-braking circuits, it is necessary in this circuit to provide for removing the source of energy from the motor when it has substantially come to rest during a braking period. The object of this is to eliminate reversal of the motor and to minimize the coasting time. A thermal time-delay relay 26, having a thermally responsive element 27, contacts 28 and a heater 29, is employed and is preset by means of an adjustable resistor 30, in shunt with said heater 29, to anticipate the duration of the braking period as will be explained more in detail presently.

The operation of this braking circuit is as follows. When it is desired to start the motor 1, push-button 19 is depressed and momentarily a circuit is completed from the line L3 through contacts 20, operating coil 7, and contacts 25 to the line L1. This causes contactor 6 to pick up, thus closing contacts 8, 9 and 10 to connect the motor windings to the supply lines to start the motor. Closure of contacts 11 provides a closed shunt path around the push-button contacts 20 thus maintaining the circuit just described even though the push-button itself is closed only momentarily. The motor is brought up to speed and runs normally with this connection.

When it is desired to stop the motor, push-button 21 is closed momentarily. This completes a circuit from supply line L3 through contacts 11, contacts 22, through the parallel path comprising coil 24 of relay 23 and operating coil 13 of stopping contactor 12, through contacts 28, heater 29 in parallel with adjustable resistor 30, to the line L1. First, relay 23 picks up and opens contacts 25 thus deenergizing the operating coil 7 and releasing the contactor 6. Then contactor 12 picks up and closes its contacts 14, 15, 16 and 17 to connect L1 to winding 3, L3 to winding 5 and capacitor 18 between windings 3 and 4. Upon the closure of contacts 17, the operating coils 13 and 24 are maintained in energized condition by the following circuit which is independent of push-button contacts 22. From line L3 through contacts 17, through coils 13 and 24 in parallel, contacts 28, heater 29 in parallel with adjustable resistor 30, to line L1. A calibrating resistor 31 may be placed in shunt with the operating coils 24 and 13 to adjust the maximum current fed to the heater element 29 and thus to set the time range within which the adjustable resistor 30 works.

When the stopping contactor 12 closes, the motor is connected as a split-phase capacitor motor of reversed phase rotation relative to the polyphase magnetic field and plugging begins. Coincidentally, the current traversing the heater coil 29 begins to heat said coil and to transfer heat energy to the thermal element 27. After a time interval, determined primarily by the setting of the adjustable resistor 30, the element 27 flexes to open the contacts 28. This opens the energizing circuit to coils 13 and 24, thus returning contactor 12 to its normally-open condition and relay 23 to its normally-closed condition. The motor is now disconnected from the line and, if not already at standstill, will coast briefly to a stop. The circuit has completed a full cycle of operation and is returned to its original condition.

It is essential that the time necessary to brake the motor to standstill be anticipated and that the adjustable resistor be preset to remove the energy supply from the motor substantially at standstill. This can be quite accurately set after a few trials and will not vary much, particularly on a normal production load cycle where the inertia and resistance components of the load remain substantially unchanged.

Figure 2:
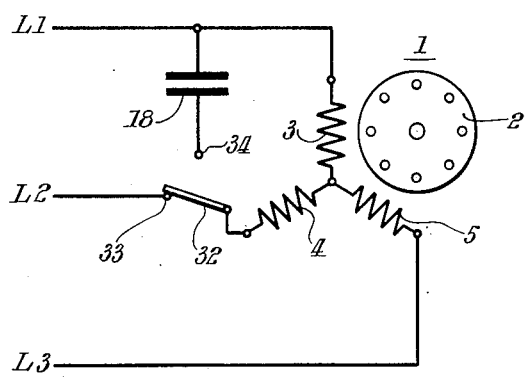
Fig. 2 is a schematic illustration showing the invention in its simplest form.

The circuit shown in Fig. 2 is a simplified showing of the primary circuit changes just described with reference to Fig. 1. A single-pole double-throw switch is shown having a blade 32 and stationary contacts 33 and 34. When blade 32 is connected to contact 33 the motor is in its normal running condition and corresponds to closure of the starting contactor 6 in Fig. 1. Similarly, when the blade 32 contacts 34, the braking connection is established and corresponds to closure of the stopping contactor 12 in the circuit of Fig. 1.

It is to be understood that the braking connection of this invention is, in fact, a split-phase connection productive of motor torque, which torque is in opposition at all speeds to the normal polyphase rotation of the motor. It is to be especially distinguished from dynamic braking which provides a smaller braking torque and one which decreases to zero as the speed approaches standstill.

The single-phase plugging provided by the circuit of this invention produces braking torques which are inherently somewhat smaller than for polyphase plugging thus easing the strain on the driven mechanical equipment and making it unnecessary to use special voltage-reducing devices.

Figure 3:
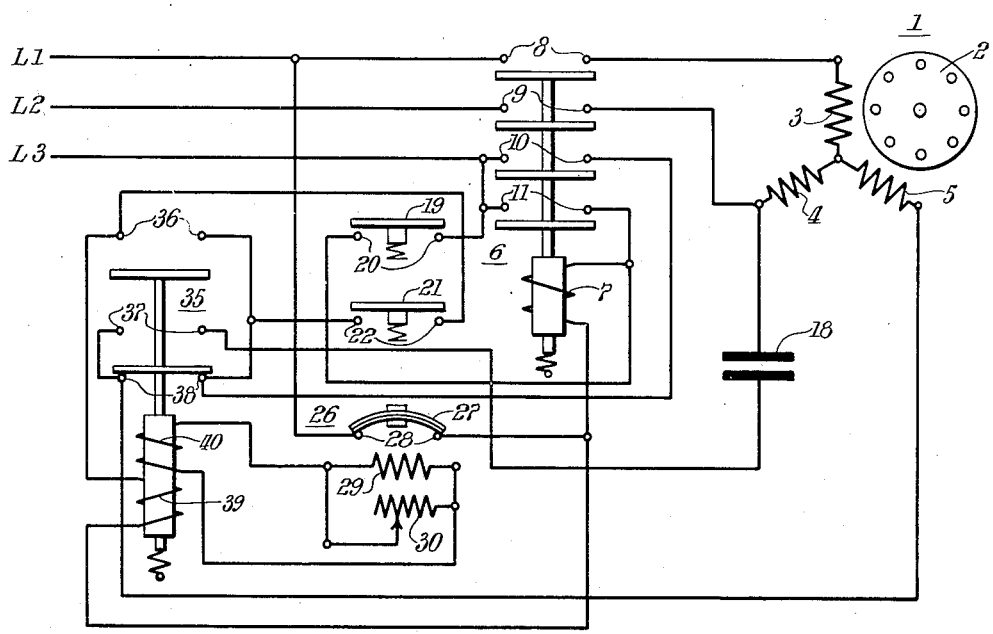
Fig. 3 illustrates a modification of the circuit of Fig. 1 and requires the use of only one contactor.

A simplification of the circuit of Fig. 1 appears in Fig. 3 wherein but one contactor is required and a plugging relay 35, which is a modification of the interlock relay 23 of Fig. 1, is used. A further improvement resides in the manner in which the heater element 29 derives its current and will be explained presently.

The special plugging relay 35 has normally-open contacts 36 and 37, normally-closed contacts 38, an operating coil 39, and a secondary coil 40, wound in mutually-coupled relation to the coil 39. That is to say, an alternating-current voltage of sufficient magnitude impressed on coil 39 will have a dual effect. First, the relay will pick up and second, a voltage will be induced in the secondary winding 40. The circuit of Fig. 3 is so arranged that this induced voltage is applied to the heater coil 29 of the time-delay relay 26.

The operation of the braking system of Fig. 3 is as follows. Closure of the starting push-button 19 completes a circuit from the supply line L3 through contacts 20, operating coil 7, and contacts 28 to the line L1. Thus energized, contactor 6 will pick up and close its contacts 8, 9, 10 and 11, connecting the motor windings 3, 4 and 5 to the lines L1, L2 and L3 respectively. Closure of contacts 11, in shunt with the push-button contacts 20, maintains the current to the coil 7 when said push-button is released in the usual manner. The motor will start and run as a normal polyphase induction motor.

When, during the running period, it is desired to stop the motor, the stopping push-button 21 is depressed to momentarily close the contacts 22. This sets up the following circuit. From line L3, through contacts 10, contacts 22, operating coil 39, and contacts 28 to the line L1. Thus energized, the relay 35 picks up, opens contacts 38 and closes contacts 36 and 37. Simultaneously a voltage is induced in the secondary winding 40 which immediately sets up a current in the heater 29. The closure of contacts 36 maintains the circuit by shunting the push-button contacts 22. It is to be noted that the contactor 6 remains closed, the operating coil 7 thereof being energized by way of the circuit from L3 through contacts 11, coil 7, contacts 28 to the line L1. The interchange in closure of the contacts 37 and 38 of plugging relay 35 removes the line L3 from winding 5 and connects the braking capacitor 18 across the terminals of windings 4 and 5.

After a predetermined time interval, governed primarily by the setting of the adjustable resistor 30, the thermal element 27, influenced by heat energy received from the heater 29, will flex to open the contacts 28. This opens the circuit to coil 7 and the contactor 6 drops out, entirely disconnecting the motor from the source of supply. At the same time the coil 39 is deenergized and relay 35 returns to the normal position. The circuit has now been returned to its original condition, having completed a starting, running, and stopping cycle.

As was pointed out above in connection with the circuit of Fig. 1 it is also necessary in this circuit to predict the length of time required to brake the motor to standstill in order to properly preset the adjustable resistor 30 so that the contactor 6 will be opened when the motor speed has been reduced to approximately zero. In this circuit there is no interlocking problem at all because the single contactor 6 remains closed throughout the running and braking periods.

It will be seen that these circuits are inherently fool-proof. For example, if the stopping pushbutton is inadvertently depressed when the motor is standing still no response will follow because the circuit controlled by said push-button is fed through auxiliary contacts of the starting contactor, which contacts are open under these conditions. This protects against the possibility of reverse starting. By examination of the simplified primary circuit of Fig. 2, it is evident that, even in the rare event of a faulty braking capacitor no really serious trouble can develop. For example, if the capacitor becomes short-circuited, the motor will be dynamically braked after the manner indicated in the Austrian Patent No. 109,348, Dec. 15, 1927. On the other hand, if the braking capacitor is open-circuited, the result is that the motor will run single-phase for a time and then coast to a stop.

The use of the secondary coil 40 in the circuit of Fig. 3 to obtain current for the heater 29, produces a braking system which is not thrown off calibration by ordinary changes in the terminal voltage. This is because the rate of heating in the thermal relay 26 can, in this way, be made to follow more closely the actual variation in the braking torque with voltage change. That is to say, an increase in terminal voltage increases the plugging or braking torque and thus lowers the braking time. Similarly, this same increase in terminal voltage increases the rate of heating and decreases the time delay period. If the heater coil were fed directly from the terminal voltage or through resistors, the rate of heating would, of course, vary as the square of the voltage. On the other hand the braking torque of the motor varies at a rate less than the square of the terminal voltage due to voltage drops and to saturation effects in the motor. Thus to compensate for these different rates, the heater voltage is derived as a modified voltage from the secondary coil 40 by transformer action from the operating coil 39 thereof. The relay magnetic structure provides the proper leakage paths so that the secondary voltage is modified to simulate the response of the motor braking torque to terminal voltage variation.

It will be obvious to those skilled in the art that the invention may, without departure from its essential attributes, be embodied in various specific forms other than those shown and described, which latter are to be considered in all respects as illustrative of the invention and not restrictive, reference being had to the appended claims rather than to the foregoing description to indicate the scope of the invention.

Having thus set forth the nature of the invention, what I claim herein is:

1. A motor control system comprising, in combination, a polyphase induction motor, a source of polyphase electrical energy, means for connecting said motor to said source for effecting rotation of said motor in a predetermined direction, means for selectively reconnecting said motor as a split-phase motor across one phase of said source to effect plugging of said motor, means for disconnecting said motor from said source, a voltage modifying device, and adjustable timing means for controlling said disconnecting means, said timing means including a heater fed from said voltage modifying device.

2. A motor control system comprising, in combination, a polyphase induction motor, a source of polyphase electrical energy, means for connecting said motor to said source for effecting rotation of said motor in a predetermined direction, means including a relay for selectively reconnecting said motor as a split-phase motor across one phase of said source to effect plugging of said motor, said relay having an operating coil and a secondary coil inductively coupled to said operating coil, and thermal timing means including a heater connected to said secondary coil for controlling the disconnection of said motor from said source.

3. A motor control system comprising, in combination, a polyphase induction motor, a source of polyphase electrical voltage, means for connecting said motor to said source for effecting rotation of said motor in a predetermined direction, means for selectively reconnecting said motor as a split-phase motor across one phase of said source to effect plugging braking of said motor, the braking time of said motor being a function of said source voltage, timing means, operative from said voltage, for anticipating said braking time and means for modifying said voltage before application to said timing means to compensate for changes in the braking time due to changes in said voltage.

4. A motor control system comprising, in combination, a polyphase induction motor, a source of polyphase electrical energy, means for connecting said motor to said source for effecting rotation of said motor in a predetermined direction, means for selectively reconnecting said motor as a split-phase motor of reversed rotation across one phase of said source to brake said motor and adjustable timing means responsive to the heating of an element by current supplied thereto by a voltage modified from the source voltage by means of a transformer device, said timing means being preset to cause removal of said motor from said source of energy substantially when said motor comes to rest.

HARRY B. FUGE.

REFERENCES CITED

The following references are of record in the file of this patent:

UNITED STATES PATENTS

| Number | Name | Date |
|---|---|---|
| 1,828,564 | Hardesty | Oct. 20, 1931 |
| 1,849,847 | Mittnacht | Mar. 15, 1932 |
| 2,320,192 | Rathbun | May 6, 1947 |

FOREIGN PATENTS

| Number | Country | Date |
|---|---|---|
| 487,695 | Great Britain | June 24, 1938 |